United States Patent [19]

Spaargaren

[11] Patent Number: 4,553,647
[45] Date of Patent: Nov. 19, 1985

[54] WHEEL CYLINDER AND TORQUE PLATE CONSTRUCTION

[75] Inventor: Robert Spaargaren, Granger, Ind.

[73] Assignee: Allied Corporation, Morristown, N.J.

[21] Appl. No.: 597,146

[22] Filed: Apr. 5, 1984

[51] Int. Cl.$^4$ .............................................. F16D 65/14
[52] U.S. Cl. ................................. 188/206 R; 188/331; 188/340
[58] Field of Search ............. 188/340, 341, 336, 342, 188/18 R, 152, 234, 250 F, 250 G, 206 R, 206 A, 331, 335, 78; 192/75

[56] References Cited

U.S. PATENT DOCUMENTS

| | | | |
|---|---|---|---|
| 1,932,879 | 10/1933 | Bendix | 188/331 |
| 2,412,335 | 12/1946 | House | 188/331 |
| 2,475,492 | 7/1949 | Goepfrich et al. | 188/340 X |
| 2,528,707 | 11/1950 | Porter | 188/331 |
| 3,869,027 | 3/1975 | Chlebowski | 188/340 |
| 4,150,736 | 4/1979 | Marti | 188/340 X |
| 4,200,174 | 4/1980 | Borugian et al. | 188/341 X |
| 4,363,387 | 12/1982 | Roberts | 188/341 X |

Primary Examiner—Duane A. Reger
Assistant Examiner—Michael P. Gilday
Attorney, Agent, or Firm—Larry J. Palguta; Ken C. Decker

[57] ABSTRACT

A torque plate construction (50) comprises two stamped parts (58, 60) which are fastened together at central planar portions (62, 63) thereof and to a wheel axle housing (20) of a vehicle. Each torque plate part (58, 60) includes housing portions (77) spaced axially from the central planar portion (62, 63) of the respective plate part, the portions (77) providing a wheel cylinder housing (78). A piston cylinder (90) is disposed within the wheel cylinder housing (78), with a pair of bolts (100) and nuts (87) connecting together the portions (77) and securing the cylinder (90) within the housing (78). Each torque plate part (58, 60) has a pair of circumferentially spaced-apart notched portions (37) providing seats for a pin (40) extending from an associated brake shoe web (34), one web having an extension (39) extending between the torque plate parts to engage the piston (92). During braking application, torque is transferred by a web pin (40) to a pair of notched portions (37) and through the wheel cylinder housing (78) and bolts (100) to the central planar portions (62, 63) of the torque plate (50).

4 Claims, 3 Drawing Figures

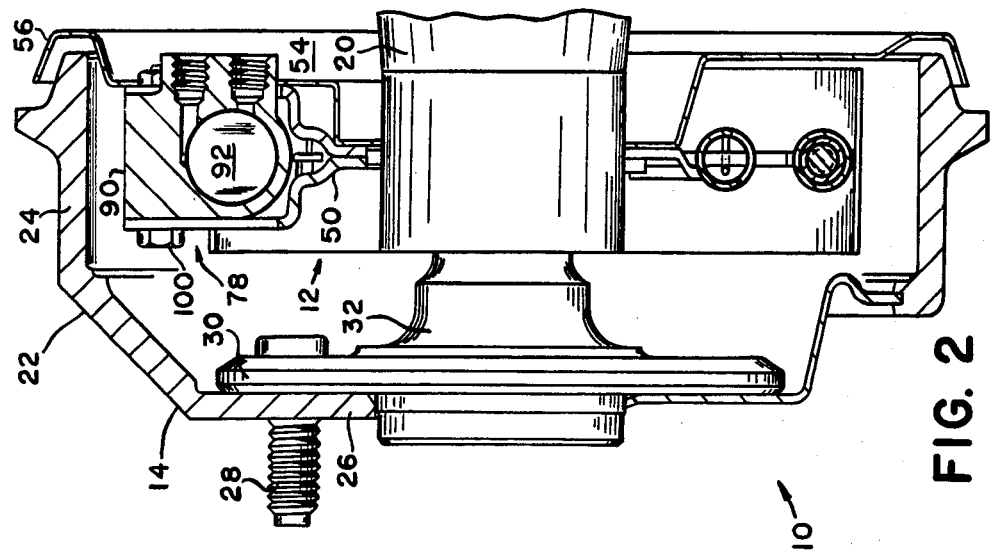
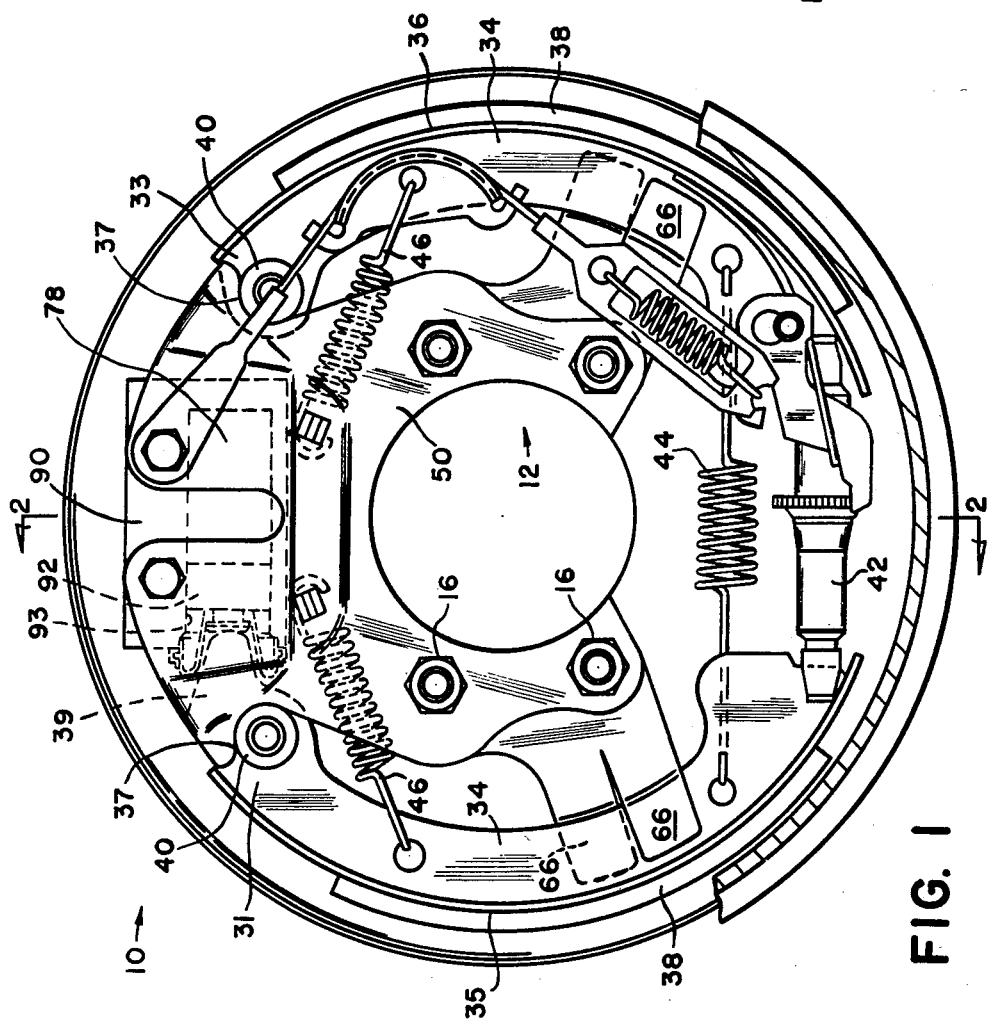

WHEEL CYLINDER AND TORQUE PLATE CONSTRUCTION

The present invention relates to a wheel cylinder and torque plate construction comprising a pair of stamped torque plates secured together with a wheel cylinder housing created therebetween for capturing a wheel cylinder, the torque plate and wheel cylinder combination effectively transferring braking torque to the central portion of the torque plate member and the wheel axle housing.

The prior art contains several torque plate designs for various drum brakes. Roberts U.S. Pat. No. 4,363,387 issued Dec. 14, 1982 and entitled "WHEEL CYLINDER AND TORQUE PLATE CONSTRUCTION" provides two identically shaped torque plates which are secured together and utilized in a mold for forming a plastic wheel cylinder. Kluger et al. U.S. Pat. No. 4,182,439 issued Jan. 8, 1980 and entitled "TORQUE MEMBER FOR A DRUM BRAKE" provides a Y-shaped torque member with an arm providing a cylindrical housing for the hydraulic actuator. Johannesen et al. U.S. Pat. No. 4,180,149 issued Dec. 25, 1979 and entitled "DRUM BRAKE AND MOUNTING MEANS THEREFOR" illustrates a backing plate for a heavy duty drum brake, the drum brake having dual web brake shoes which receive portions of the backing plate therebetween.

The present invention provides a lightweight, low cost, easily manufacturable wheel cylinder and torque plate construction for a drum brake assembly. The construction provides a structurally strong torque plate which receives and transfers braking torque through the wheel cylinder housing to bolts which secure central planar portions of the torque plate to the wheel axle housing.

The torque plate comprises two stamped parts which are fastened to one another at respective central planar portions and to the wheel axle housing of the vehicle. Each of the torque plate parts includes a housing portion spaced axially from the central planar portion of the plate part, the housing portions providing the wheel cylinder housing. A piston cylinder comprising an extruded casing is disposed within the wheel cylinder housing, with a pair of bolts connecting together the housing portions and passing through the extruded casing to secure the casing within the housing. The extruded casing includes a piston for engaging a web extension of the associated brake shoe. Each torque plate part has a pair of circumferentially spaced-apart notched portions providing seats for pins extending from the associated brake shoe webs, one of the webs having an extension between the torque plate parts for engaging the piston contained in the wheel cylinder. During braking application, brake torque is transferred by the web pin of a brake shoe to the associated pair of notched portions, through the wheel cylinder housing and bolts to the central planar portions of the torque plates and the wheel axle housing.

The invention is described in detail below with reference to the drawings which illustrate an embodiment thereof, in which:

FIG. 1 is a schematic front elevation view of a drum brake with the front of the drum brake eliminated;

FIG. 2 is a schematic view in transverse cross section, taken along view line 2—2 of FIG. 1.

Figure 3:
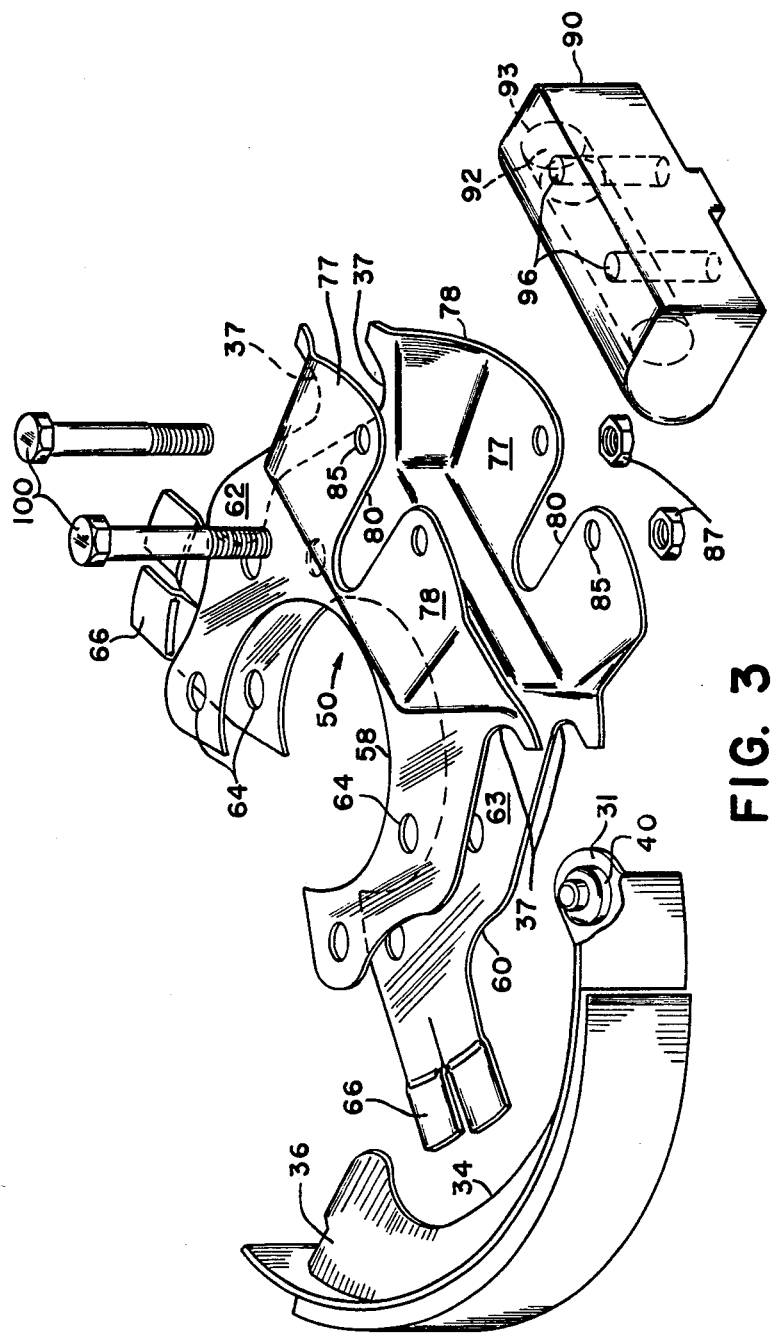
FIG. 3 is an exploded view in perspective showing the torque plate parts and selected components of the drum brake.

Referring to FIGS. 1 and 2, a duo-servo drum brake is indicated generally by reference numeral 10 and shown in schematic representation. Brake 10 includes a stationary assembly 12 and a brake drum 14, stationary assembly 12 suitably affixed by bolts 16 or the like to a stationary portion of the vehicle, such as a flange of a rear axle housing 20. The brake drum 14 has an outer cylindrical member 22 with an annular flange 24 and a circular front 26 affixed by bolts 28 or the like to a rotating portion of the vehicle, such as a wheel flange 30 of a drive axle 32. The specific drum brake design does not constitute a part of the invention.

The stationary assembly 12 includes brake shoes 35 and 36 each having arcuate webs 34 to which friction linings 38 are affixed. Brake shoes 35 and 36 have a suitable adjuster 42 and are interconnected by springs 44 and 46. Shoes 35 and 36 have web extensions 31 and 33, respectively, each with a transverse pin 40 engageable with fixed portions of a torque plate 50 providing a cylinder housing 78 for wheel cylinder 90. During braking application, the left brake shoe 35 engages the rotating drum 14 which results in the right brake shoe 36 also engaging the rotating drum such that shoes 35 and 36 are rotated slightly counterclockwise whereby pin 40 of brake shoe 36 engages portions of the torque plate 50. The torque plate and wheel cylinder are constructed in accordance with the invention.

Because the torque plate 50 transmits torque from the brake shoes 35, 36 to the rear axle housing 20, only a thin, light-weight dust or splash shield 54 (see FIG. 2) need be employed with the stationary assembly 12. Shield 54 has an outer cylindrical flange 56 which extends about the exterior portion of flange 24 to provide protection against water, dust, and other contaminants.

Referring to FIGS. 2 and 3, torque plate 50 includes a stamped front part 58 and a stamped rear part 60 which are affixed together by spot welding or riveting, by way of example. Parts 58 and 60 have central planar portions 62 and 63, respectively, with spaced bolt holes 64 for bolts 16 which secure parts 58, 60 to the flange of the wheel housing 20, with the dust shield 54 located thereabout. Two pairs of split ears 66 are off-set from the plane of central planar portion 63, and are spaced axially apart from the planar portion 62 of part 60. The split ears 66 extend along the sides of the brake shoe webs 34 (FIG. 1) to provide lateral expansion guides for the webs during braking application. Torque plate parts 58, 60 each extend axially away from the central planar portion of the respective torque plate part to form the cylinder housing 78. Cylinder housing 78 comprises essentially a pair of flat housing portions 77 each spaced axially from the associated central planar portion, with a centrally located slot 80 provided for brake line hose connections with the hydraulic actuator or wheel cylinder to be contained within the housing 78.

A wheel cylinder 90 comprises an aluminum extrusion designed for containing a piston 92 housed within the opening 93 at one end of the wheel cylinder. Piston 92 is in alignment with lateral web extension 39 (FIG. 1) of brake shoe 35 when the drum brake is assembled, whereby lateral web extension 39 abuttingly engages piston 92. Transverse pins 40 extending through the extensions 31, 33, respectively, of shoes 35 and 36 are received by circumferentially spaced-apart notches or curved recesses 37 formed adjacent each wheel cylinder housing portion 77.

When assembled, torque plate 50 comprises torque plate parts 58 and 60 secured together with wheel cylinder 90 and piston 92 disposed in wheel cylinder housing 78. FIG. 3 illustrates an exploded view of torque plate 50 and brake shoe 36. A pair of bolts 100, or other suitable securing means, connect together the respective wheel cylinder housing portions 77 by being inserted through openings 85 of a portion 77, through wheel cylinder passages 96 and openings 85 in the other portion 77, to receive nuts 87. Bolt connections 100 not only provide suitable anchoring and securement of wheel cylinder 90 within cylinder housing 78, but maintain the housing portions 77 in proper spaced-apart alignment throughout the life of drum brake 10.

In operation, pressurized brake fluid is supplied to wheel cylinder 90 via brake hose couplings (not shown) connected to cylinder 90 via the slot 80. The fluid actuates piston 92 which is displaced laterally to bias extension 39 of brake shoe 35 and its associated lining 38 into engagement with the brake drum 14. Engagement of brake shoe lining 38 of shoe 35 with rotating drum 14 causes a counterclockwise movement of the duo-servo brake shoes 35 and 36 whereby lining 38 of shoe 36 engages drum 14 and pin 40 of shoe 36 is received in the associated notches 37 of torque plate parts 58 and 60. Braking torque transmitted to notches 37 is transferred through the wheel cylinder housing portions 77 (housing 78) and bolts 100 to central planar portions 62, 63 and bolts 16 securing brake 10 to axle housing 20.

From the above, it can be seen that the wheel cylinder and torque plate construction require a minimum of manufacturing steps to produce stamped torque plate parts that are secured together to provide a lightweight, low cost, structurally strong torque plate for a duo-servo drum brake. This reduces the cost of the drum brake assembly, both in necessary assembly steps and the cost of materials, while providing a torque plate able to withstand braking stresses imparted by a brake shoe pin that engages the torque plate whereby braking torque is transferred to the wheel axle housing supporting the drum brake.

Various modifications of the above-described embodiment of the invention will be apparent to those skilled in the art. It is to be understood that such modifications can be made without departing from the scope of the invention.

I claim:

1. A wheel cylinder and torque plate combination for a drum brake assembly wherein the wheel cylinder includes an actuating piston, said combination including two torque plate parts each comprising a central planar portion affixed to the central planar portion of the other part and to a wheel axle housing or the like, one part having outwardly extending ears with each ear axially parted to provide a space for receiving a portion of an associated brake shoe web therebetween, each part having circumferentially spaced-apart notched portions each oppositely disposed and axially spaced-apart from a notched portion of the other torque plate part and for receiving a brake shoe web between the adjacent torque plate parts, the axially spaced-apart notched portions being shaped to provide curved recesses with each pair of recesses receiving therein a pin extending from an associated brake shoe, and a wheel cylinder housing portion comprising a surface disposed in a plane axially spaced-apart from the plane of the associated central planar portion, the wheel cylinder housing portions having a wheel cylinder with through passages disposed therebetween so that said actuating piston engages an associated brake shoe web extension disposed between said torque plate parts, and the spaced-apart housing portions having openings and interconnected by a pair of connectors extending through the openings of the portions and the through passages of the wheel cylinder in order to secure together and strengthen the housing portions and fixedly capture the wheel cylinder therebetween so that torque received from a pin and associated curved recesses is transmitted to said central planar portions of the torque plate.

2. The wheel cylinder and torque plate combination in accordance with claim 1, further comprising a radially aligned opening in one of said spaced-apart housing portions, said radially aligned opening providing means for connecting said cylinder to brake fluid line means.

3. The wheel cylinder and torque plate combination in accordance with claim 1, wherein said connectors comprise bolts extending between the housing portions and through the wheel cylinder, and each bolt received by threaded means.

4. The wheel cylinder and torque plate combination in accordance with claim 1, wherein said drum brake assembly comprises a duo-servo drum brake assembly wherein one of said pins abuts curved recesses of associated notched portions during braking application, and thereby transfers torque to said central planar portions of the torque plate.

* * * * *